(12) United States Patent
Cocaign

(10) Patent No.: US 6,971,704 B2
(45) Date of Patent: Dec. 6, 2005

(54) ROOF MODULE FOR A MOTOR VEHICLE

(75) Inventor: Jean-Guy Cocaign, La Tssoualle (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/601,193

(22) Filed: Jun. 23, 2003

(65) Prior Publication Data
US 2004/0075304 A1 Apr. 22, 2004

(30) Foreign Application Priority Data
Jun. 21, 2002 (FR) .................................. 02 07689

(51) Int. Cl.⁷ ............................................... B60J 3/00
(52) U.S. Cl. ..................................... 296/97.8; 296/215
(58) Field of Search ................................ 296/210, 215, 296/97.8

(56) References Cited

U.S. PATENT DOCUMENTS

| | | | | |
|---|---|---|---|---|
| 5,005,899 A | * | 4/1991 | Clenet | 296/215 |
| 5,520,434 A | * | 5/1996 | Paetz et al. | 296/215 |
| 6,331,065 B1 | | 12/2001 | Wilms | |
| 6,367,872 B1 | * | 4/2002 | Bohm et al. | 296/210 |
| 6,513,864 B2 | * | 2/2003 | Bohm et al. | 296/215 |
| 6,543,841 B1 | * | 4/2003 | Ohkubo | 296/215 |
| 6,550,851 B2 | | 4/2003 | Seifert | |
| 6,739,375 B2 | * | 5/2004 | Schlecht et al. | 296/97.8 |
| 2002/0021029 A1 | | 2/2002 | Bohm et al. | |
| 2003/0122405 A1 | * | 7/2003 | Stallfort et al. | 296/210 |
| 2003/0168889 A1 | * | 9/2003 | Comert et al. | 296/210 |
| 2003/0197401 A1 | * | 10/2003 | de Gaillard | 296/220.01 |

FOREIGN PATENT DOCUMENTS

| | | | |
|---|---|---|---|
| DE | 019955710 C1 | * | 5/2001 |
| DE | 199 56 567 A1 | | 6/2001 |
| DE | 10218601 A1 | * | 11/2003 |
| EP | 1 153 820 A2 | | 11/2001 |

* cited by examiner

Primary Examiner—Jason Morrow
(74) Attorney, Agent, or Firm—Nixon Peabody LLP; David S. Safran

(57) ABSTRACT

Roof module (1) which is designed for covering an opening (102) made in a roof (101) of a motor vehicle (100), the opening (102) extending in the transverse direction between two lateral roof elements (103, 104) and in the lengthwise direction between a front roof element (107) and a rear roof element (108), characterized in that the roof module (1) forms an installation unit which has:
  a glass pane (2)
  a darkening device (20), and
  a support brace (13) which has a motor gear (15) for driving the darkening device (20, 30).

12 Claims, 2 Drawing Sheets

ROOF MODULE FOR A MOTOR VEHICLE

BACKGROUND OF THE INVENTION

1. Field of the Invention

This invention relates to a roof module for covering an opening provided in the roof of a motor vehicle.

2. Description of Related Art

It is known that the roof of a motor vehicle can formed at least partially of a glass pane. Normally, the opening provided in the roof is bordered by a support surface which is used as a rabbet and which is designed for holding the peripheral edge of the indicated glass pane. Conventionally, the opening extends in the transverse direction between the sides of the body and in the lengthwise direction between the front roof element which separates the roof from the windshield and the rear roof element which separates the roof from the back window.

In practice, this type of glass roof is conventionally used in combination with a system for shading or darkening the daylight. The purpose for shading or darkening the daylight is essentially to limit the development of heat in the passenger compartment on days with strong incident solar radiation.

The darkening of the glass pane which forms the roof part takes place in the conventional manner by operating a louver unit or interconnected plates or a blind unit. These darkening systems are generally mechanized, and therefore, have extension mechanisms, and also guide mechanisms which are relatively complex and which must be installed in the vehicle.

This results in that, if it is desirable to equip a motor vehicle with a glass roof, a large number of elements which are independent of one another must be installed, specifically a glass pane, a darkening device, an opening device, guide systems, etc.

Otherwise, most of these independent elements must be additionally structually joined among one another so that they perform the darkening function; this further complicates the installation process.

SUMMARY OF THE INVENTION

Thus, a primary object of the present invention is to provide a prefabricated component or equipment module which is designed to close an opening which is made in a the motor vehicle, the opening extending transversely between the two lateral roof element, and in the lengthwise direction, between the front roof element and the rear roof element, the side roof elements, the front roof element and the rear roof element each having a peripheral rabbet on their edges which border the opening, and the proposed roof module making it possible to avoid problems according to the prior art by offering an especially major simplification of the installation effort, and in doing so, at the same time, producing a significant shortening of the installation times on the motor vehicle.

The object of the invention is achieved in that the roof module has:

a glass pane which is suited for being permanently connected to the peripheral rabbets which border the opening, a darkening device which is able to be deployed parallel to the inside surface of the glass pane, guide means which are permanently connected to the inside surface and along side each edge of the glass pane, the indicated guide means interacting with the free ends of the darkening device, and a support brace which is mounted on the inside surface and along either the front of the rear transverse edge of the glass pane, the indicated support brace bearing a motor gear for driving the darkening device.

The invention defined in this way has the advantage of forming a complete submit which is also ready to install, i.e., therefore, a tested device which is ready to operate. in a vehicle assembly line, this modular structure makes it possible to greatly simplify installation of a glass roof in the roof of a motor vehicle. The process of mounting the roof module in accordance with the invention is, in fact, limited to a single process which is comprised solely of securely connecting the glass pane to the body. The gain with respect to the installation time is thus considerable; this represents a major advantage in the automobile industry, where productivity is a synonym, for economic competitiveness.

Furthermore, the invention relates to other features which will become apparent from the following description and each of which can be considered individually or according to all their possible technical combinations.

This description which is given as a nonrestrictive example better illustrates how the invention can be implemented and in the specification reference is made to the accompanying drawings:

DETAILED DESCRIPTION OF THE INVENTION

For reasons of clarity, components common to the different embodiments are labeled with identical reference numbers in the figures. Furthermore, only the components which are important to the understanding of the invention are shown, and the drawings have not been done to-scale, but only in schematic form.

Figure 1:
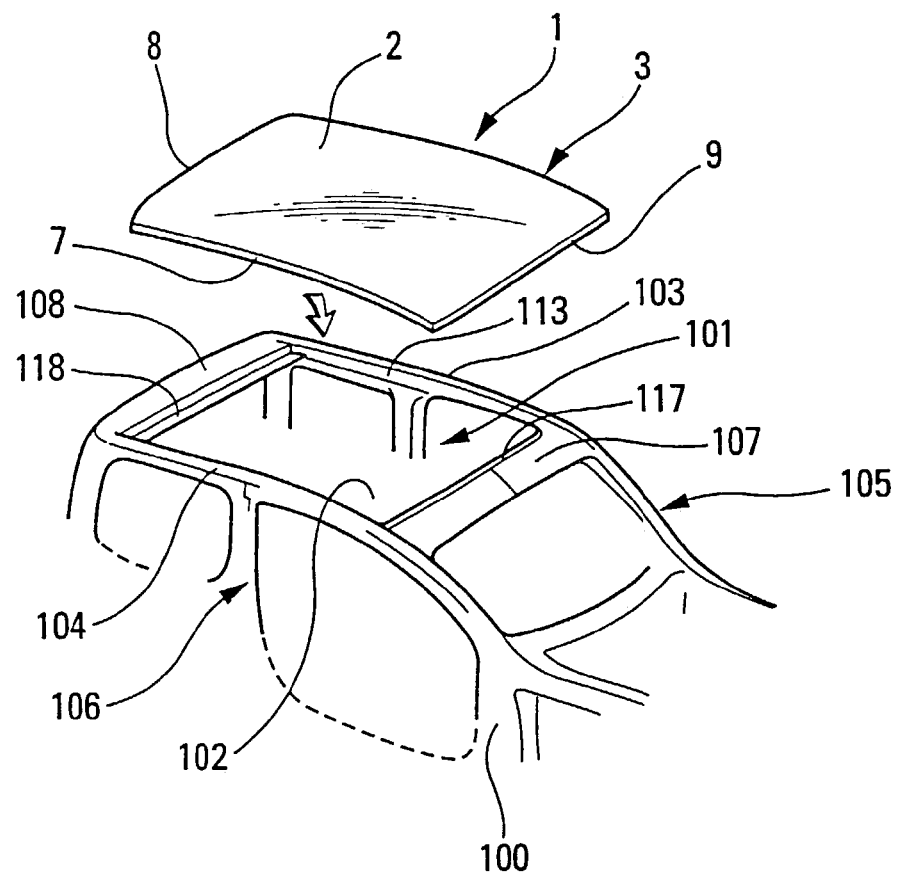
FIG. 1 is a partial perspective view showing the installation of a roof module in accordance with the invention on a motor vehicle.

FIG. 1 shows a motor vehicle 100 having an opening 102 in its roof 101 which is designed to accommodate a roof module 1 in accordance with the invention. The opening 102 is bordered in the transverse direction by two lateral roof elements 103, 104, which are each mounted on a respective side 105, 106 of the body. In the lengthwise direction, the opening 102 is bordered by a front roof element 107 and a rear roof element 108. Each of the indicated roof elements 103, 104, 107, 108 has a rabbet 113, 114, 117, 118 which is located along its inside edge, i.e. therefore along the edge which runs on the opening 102. The whole is made such that the four rabbets 113, 114, 117, 118 form a continuous receiver which is suitable for holding the roof module 1, more accurately, the outside edge 3 of the glass pane 2 which forms the roof.

Figure 2:
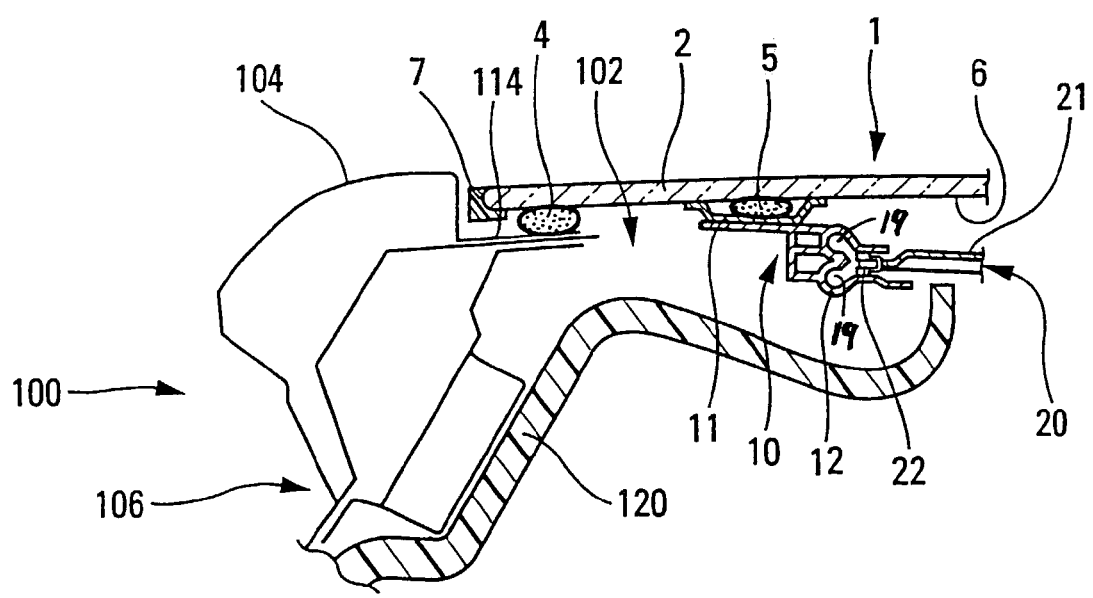
FIG. 2 is a partial cross-sectional view of the roof module in accordance with the invention.

In the embodiment shown in FIG. 2, the roof module 1 is mounted on the roof 101 of the motor vehicle 100 by the whole of the periphery 3 of the glass pane 2 being cemented onto the four, peripheral rabbets 113, 114, 117, 118 which are arranged continuously.

In particular, in the indicated FIG. 2 it is apparent that the glass pane 2 is securely joined to the rabbet 114 of the side roof element 104 by means of cement 4. Cementing is continuous on the entire length of the side edge 7 of the glass pane 2 so that the connection to the rabbet 114 is completely tight.

A darkening device with louvers or panes 20 which is shown partially in this example is designed to prevent light from penetrating into the interior. The indicated darkening device 20 with the louvers or pane elements is a darkening device of any conventional type which need not be described here. So that this darkening device with louvers 20 can be extended parallel to the inside surface 6 of the glass pane 2, and in the direction perpendicular to the plane of the figure, there are guide means 10 on either side of the glass roof 2.

Each guide means 10 is advantageously mounted by cementing 5 on the inside surface 6 of the glass pane 2 along each of the side edges 7.

In this special embodiment, the guide means 10 has a lengthwise brace 11 which is cemented directly on the inside surface 6 of the glass pane essentially parallel to the side edge 7. The indicated lengthwise brace 11 bears a guide rail 12 which likewise runs in the lengthwise direction and which is suited for interacting in the conventional manner with the corresponding side end 22 of a bow or transverse rod 21 which is mounted on the free end of the darkening device with louvers 20. A similar guide means is provided parallel to the opposite lateral side edge 7.

The connection between the glass pane 2 and each side rabbet 113, 114 and of each guide means 10 is covered here by an inside lining 120 relative to viewing by possible passengers of the motor vehicle 100.

Figure 3:
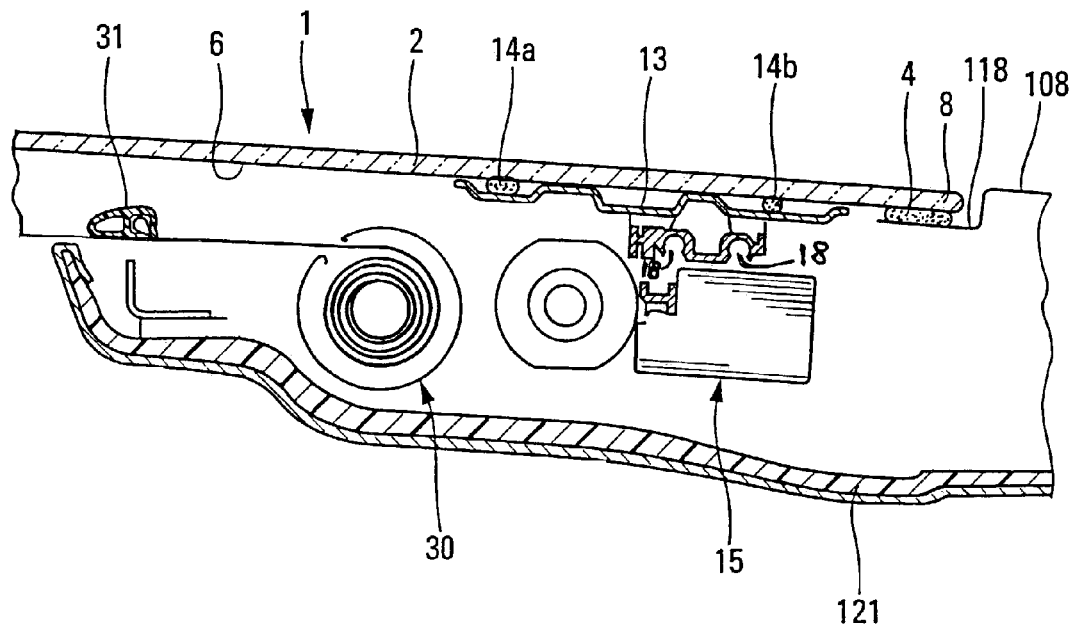
FIG. 3 is a partial lengthwise section of a roof module according to a special embodiment in accordance with the invention.

In accordance with the invention, the roof module 1 as shown in FIG. 3 has a support brace 13 which is attached on the inside surface 6 of the glass pane 2 behind the latter and has a geared motor 15 which controls the motion of a curtain-like darkening device 30 which is extended in the direction parallel to the plane of the figure.

The darkening device 30 is, like the motor gear 15, securely connected to the brace 13. It is a curtain-like darkening device 30 of the conventional type which need not be described here. Just as in the above described darkening device with louvers 20, the curtain-like darkening device 30 has a transverse rod 31 which is attached to the free end of the curtain and its side ends (not shown) are guided in the guide rails 12.

In this special embodiment, the transverse brace 13 is attached along the rear side edge 8 of the glass pane 2. The darkening device 30, which in this embodiment is of the curtain type, must accordingly be extended from back to front so that the glass pane 2 is darkened. The transverse brace 13 is advantageously joined here by means of cement 14a, 14b, the glass pane 2. The cementing can take place over the entire length of the transverse brace 13 in spots or continuously.

The connection between the glass pane 2 and the rear rabbet 118 and the transverse brace 13/geared motor 15/darkening device 30 assembly is covered here relative to viewing by possible passengers of the motor vehicle 100, as described above, by an inside lining 121. The latter can, of course, be permanently connected to the side lining 120 and can formed as a single part with it.

Figure 4:
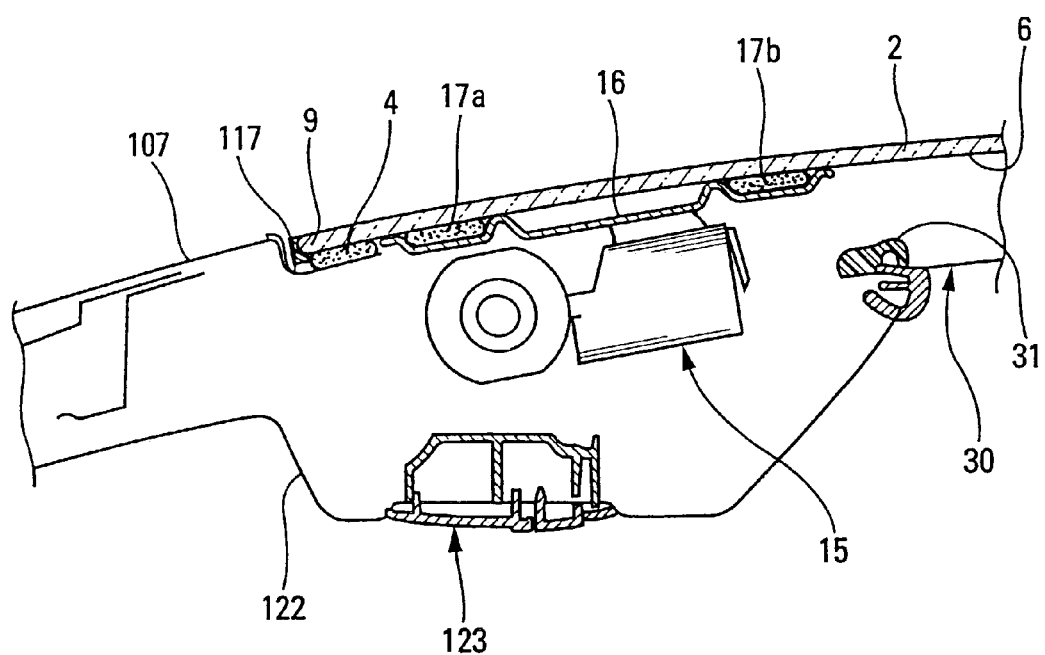
FIG. 4 is a partial lengthwise section a roof module according to another embodiment of the invention.

In the version of the embodiment shown in FIG. 4, the front brace 16 bearing the motor gear 15 is attached by cementing 17a, 17b to the inside surface 6 and along the front transverse edge 9 of the glass pane 2.

In this case, the darkening device 30 is permanently connected to the brace 16.

The totality of these elements is lined here by an inside lining 122 relative to viewing by possible passengers of the motor vehicle 100, which lining holds a dome light 123. As above, the indicated lining 122 can be securely joined to the lateral lining 120 which, optionally, for its part is securely connected to the rear lining 121, with which therefore a single or coherent workpiece is formed.

Therefore, a modular unit was described above which is comprised of a glass roof with all the corresponding accessories mounted on its bottom: a darkening device with louvers 20 (FIG. 2) or of the curtain type (FIGS. 3 & 4); the motor gear 15 for controlling the motion of the darkening device 20, 30 which is mounted on the front brace 16 (FIG. 4) or the rear brace 13 (FIG. 3), lateral guide means 10, etc.

Of course, the motor gear 15 drives cables (not shown) which move in transverse pipes 18 (FIG. 3) and lengthwise pipes 19 (FIG. 2) which are provided in the braces 13, 16 and the guides 10 and in the conventional manner are mounted on the side ends of the transverse rods 21, 31.

Such a modular unit can be easily inserted and fixed on the edges of the opening 102 in one piece.

Of course, this invention is not limited to the above described embodiments, but rather numerous modifications and versions can be implemented without departing from the framework of the invention.

What is claimed is:

1. Roof module for closing an opening in a roof of a motor vehicle that extends transversely between two lateral roof elements and in a lengthwise direction between a front roof element and a rear roof element, and the lateral roof elements, the front roof element and the rear roof element each having a peripheral rabbet on edges thereof which border the opening, the roof module comprising:
   a glass pane adapted for permanent connection directly to the peripheral rabbets which border the opening,
   a darkening device which is deployable parallel to an inside surface of the glass pane,
   guide means for guiding the darkening device, the guide means being permanently mounted directly on the inside surface of the glass pane along each of opposite side edges of the glass pane, the guide means interacting with edges of the darkening device,
   a support brace mounted on the inside surface along one of front and rear transverse edges of the glass pane, the support brace having a motor drive for driving the darkening device.

2. Roof module in accordance with claim 1, wherein the glass pane is adapted to be mounted on the peripheral rabbets by cementing.

3. Roof module in accordance with claim 1, wherein each guide means is directly mounted by cementing on the inside surface of the glass pane.

4. Roof module in accordance with claim 1, wherein the support brace is directly mounted on the inside surface of the glass pane by cementing.

5. Roof module in accordance with claim 1, wherein the darkening device comprises louvers and is permanently connected to the brace.

6. Roof module in accordance with claim 1, wherein the darkening device comprises a roll-up blind which is permanently connected to the brace.

7. Motor vehicle roof, comprising:
a front roof clement,
a rear roof element,
side roof elements extending in a lengthwise direction between the front roof element and the rear roof element at opposite lateral sides of the roof,
a peripheral rabbet on inner edges of the side roof elements, the front roof element and the rear roof element which border an opening defined thereby, and
a roof module having a glass pane permanent mounted directly on the peripheral rabbets,
a darkening device carried by the glass pane and deployable parallel to an inside surface of the glass pane,
guide means for guiding the darkening device, said guide means being permanently mounted directly on the inside surface of the glass pane along each of opposite side edges of the glass pane, the guide means interacting with edges of the darkening device,
a support brace mounted on the inside surface along one of front and rear transverse edges of the glass pane, the support brace having a motor drive for driving the darkening device.

8. Motor vehicle roof in accordance with claim 7, wherein the glass pane is mounted on the peripheral rabbets with cement.

9. Motor vehicle roof in accordance with claim 7, wherein each guide means is directly mounted on the inside surface of the glass pane with cement.

10. Motor vehicle roof in accordance with claim 7, wherein the support brace is directly mounted on the inside surface of the glass pane with cement.

11. Motor vehicle roof in accordance with claim 1, wherein the darkening device comprises louvers and is permanently connected to the brace.

12. Motor vehicle roof in accordance with claim 1, wherein the darkening device comprises a roll-up blind which is permanently connected to the brace.

* * * * *